United States Patent [19]

Linder

[11] Patent Number: 4,794,335
[45] Date of Patent: Dec. 27, 1988

[54] METHOD AND APPARATUS FOR MEASURING THE THICKNESS OF A METAL MELT ADJACENT THE BOTTOM OF A CONTAINER

[75] Inventor: Sten V. Linder, Trosa, Sweden

[73] Assignee: Studsvik Energiteknik, Nyköping, Sweden

[21] Appl. No.: 554,701

[22] Filed: Nov. 23, 1983

[30] Foreign Application Priority Data

Dec. 6, 1982 [SE] Sweden .................. 8206963

[51] Int. Cl.$^4$ .............. G01N 27/74; G01R 33/12; G01F 23/00
[52] U.S. Cl. .................. 324/204; 324/207; 324/239; 73/290 R
[58] Field of Search ............ 324/204, 207, 208, 229, 324/228, 239, 234, 236; 164/4.1, 150, 154, 156, 449; 73/290 R

[56] References Cited

U.S. PATENT DOCUMENTS 3,942,105  3/1976  Bondarenko et al. ............. 324/234
4,144,756  3/1979  Linder ............................ 73/290 R
4,267,508  5/1981  Ando ............................. 324/207

FOREIGN PATENT DOCUMENTS 0029800  3/1977  Japan ................................ 324/204

Primary Examiner—Reinhard J. Eisenzopf
Assistant Examiner—Walter E. Snow
Attorney, Agent, or Firm—Burns, Doane, Swecker & Mathis

[57] ABSTRACT

The thickness of the layer of remaining molten metal at the bottom of a container is measured on tapping molten metal from the container. An alternating magnetic field is generated with a frequency such that the penetration depth ($\delta$) in the metal is of the same order of magnitude as the residue thickness of the melt layer of interest for measurement. The alternating magnetic field is generated such that to begin with field components are reflected at a horizontal surface of the melt layer and towards an alternating magnetic field detection position. When the thickness of the melt layer decreases and approaches the residue thickness, less and less field components will be reflected at the surface of the melt and pass instead through the remaining melt layer. The resulting change in detected alternating magnetic field is utilized, e.g. for triggering an alarm or breaking off tapping in some other way.

6 Claims, 3 Drawing Sheets

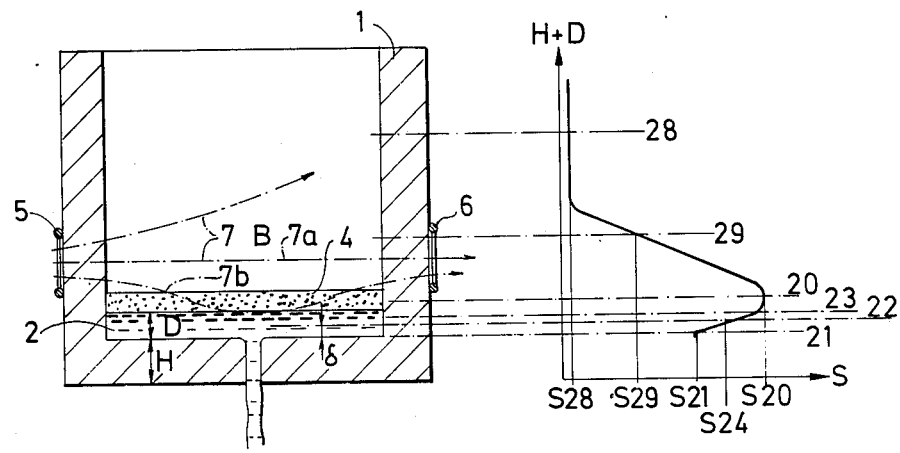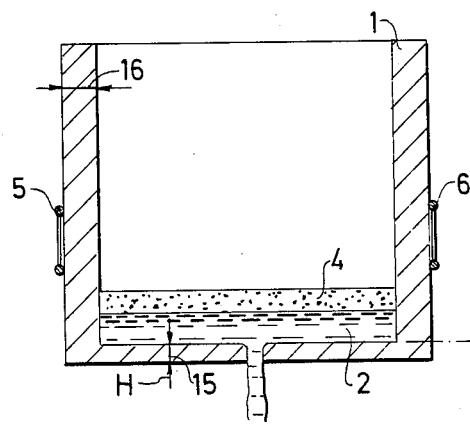

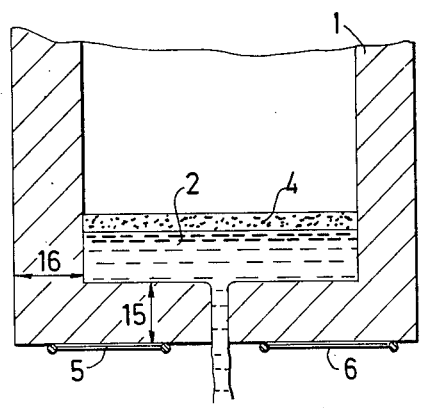
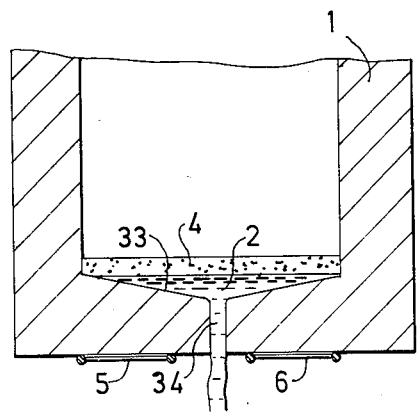
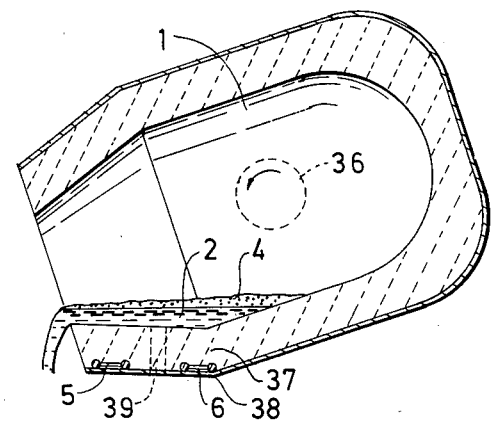
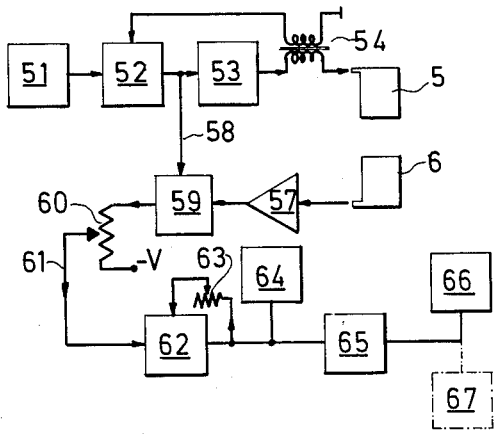

METHOD AND APPARATUS FOR MEASURING THE THICKNESS OF A METAL MELT ADJACENT THE BOTTOM OF A CONTAINER

TECHNICAL FIELD

The present invention relates to a method and apparatus for measuring remaining molten metal at the bottom of a container such as a furnace, ladle or the like, with the aid of an alternating magnetic field, there being utilized an alternating magnetic field generated by a transmitter coil and the interaction of this field with the melt, this interaction effect being measured with the aid of a receiver coil.

TECHNICAL BACKGROUND

In tapping furnaces, ladles and other containers for molten metal, it is often difficult to decide when tapping is to be broken off. The metal is often covered by another phase, generally slag, which it is desired to avoid tapping with the metal in the last stage of the tapping process. This other phase—the slag—may be damaging to the continued process, or it may cause poor quality in the ready-cast metal.

It is generally extremely difficult to decide with the aid of the eye when slag instead of metal is starting to flow out, partly due to the high temperatures at which metals are processed, making both slag and metal red- to white-hot, partly due to the fact that both slag and steel are not transparent, and one can thus only see surfaces, and not what there is inside the flowing tap stream, for example, and partly due to the fact that the slag in view of vortex effects, i.e. whirl formation in the tap hole area, generally positions itself in the middle of the outgoing tap stream.

The above-mentioned difficulties of seeing when tapping is to be broken off, i.e. when slag instead of molten metal begins to flow out from the tap hole, or if tapping is done by tipping the furnace, ladle or the like, when slag begins to run with the metal, have caused methods to be sought after in the metallurgic industry for measuring when tapping is to be broken off, so that the maximum amount of molten metal can be obtained from the container while simultaneously tapping off slag is avoided to as great an extent as possible.

It is thus of great interest to accurately measure both remaining molten metal in the furnace and the amount of molten metal and/or slag flowing out during the final stage of tapping, i.e. that part of tapping when there is risk of slag accompanying the melt. Under practical conditions, the thickness or the depth of the remaining melt varies between 20 and 0.5 cm, depending on the size of the system, the diameter of the tap hole and the nature of the slag, in this interesting part of the tapping procedure which in continuation is denoted the final phase of the tapping procedure. The largest values are applicable to large containers and large tap holes (typical container diameter is 4 m, typical tap hole diameter 50 mm) and the smallest values for small containers (typical container diameter 2 dm, typical tap hole diameter 5 mm).

It has been attempted to weigh the process vessel and with the aid of a knowledge of the original weight of metal, it has been attempted to decide when the metal in the furnace, ladle etc. is coming to an end. Such a method is extremely uncertain, however, since there is no possibility of separating the weights of metal and slag, and since there is no possibility of deciding whether the furnace has been worn during the tapping process.

It has been further attempted to measure the vibrations of the tap nozzle, thereby to decide if molten metal or slag is running through it. However, the method is uncertain and has poor precision, for which reason no operational method has been able to be developed therefrom.

It is conceivable to measure the level of the molten metal, while utilizing the methods and apparatuses described in our patents U.S. Pat. No. 4,144,756 and U.S. Pat. No. 4,138,888 and GB No. 1,585,496. In doing so, the tapping procedure should be broken off on reaching a certain level of the molten metal. The bottom of the furnace, ladle or the like, from which tapping takes place, is generally subjected to wear, however, and such a method therefore would lead to different amounts of metal being left in the furnace, ladle etc., depending on the wear in the furnace etc.

OBJECT OF THE INVENTION

An object of the present invention is to provide a new method and a new apparatus for measuring the remaining amount of metal melt at the "bottom" i.e., across the width, of a container in conjunction with tapping, whereby the problems accounted in the prior art discussed above will be alleviated while oter advantages are also gained at the same time.

SUMMARY OF THE INVENTION

The above-mentioned object is achieved by the method and the apparatus in accordance with the invention having the distinguishing features disclosed in the appended claims.

The invention is thus based on measuring the thickness of the layer of the remaining molten metal, the relative position of which in the container (which position can vary due to lining wear) will consequently substantially lack importance, instead of measuring the absolute level of the molten metal in the container, i.e. the absolute position of the upper surface of the metal melt. The invention is further based on utilizing the fact that an alternating magnetic field can be caused to be "reflected" at the surface of a relatively thick layer of molten metal, but that the field begins to penetrate the layer when its thickness approaches the penetration depth of the alternating magnetic field in the metal, the penetration ability increasing when the layer thickness decreases. The term "reflection" as used herein pertains to the apparent effect on the lines of force of the alternating magnetic field which is obtained due to the interaction of the alternating magnetic field and the melt on each other and associated induced currents in the metal.

A distinguishing feature of the invention is that the alternating magnetic field is generated having a frequency such that the penetration depth $\delta$ of the field in the metal will be of the same order of magnitude as the residual thickness of the layer of molten metal, of interest at each measurement occasion. In accordance with the invention the penetration depth should be greater than the residual thickness, preferably 1–4 times, and particularly 2–3 times this thickness. By "residual thickness" is to be understood in a broad sense the thickness layer at which it is intended to break off tapping or sound an alarm or the like.

Further distinguishing for the invention is that the alternating magnetic field is generated and detected such that in the final phase of the tapping procedure, from having detected a utilizable alernating magnetic field reflected at the upper or lower surface of the remaining melt layer, there will be detected a decreasing reflected field as a result of the ability of the field to penetrate the remaining layer of molten metal. Field penetration increases until the penetration depth δ of the field is attained, i.e., when the penetration depth reaches the same order of magnitude as the thickness of the remaining layer of molten metal.

Further distinguishing features and advantages of the invention will be apparent from the following detailed description of exemplifying embodiments, while referring to the accompanying drawings.

BRIEF DESCRIPTION OF DRAWINGS

FIG. 3a illustrates a container of the same kind as in FIGS. 1 and 2, but where the coils are placed at the sides in the wall of the container just above the area of interest.

FIG. 3b illustrates the course of the associated signal curve.

FIG. 4a illustrates a container as in FIG. 3, where the container is subjected to wear.

FIG. 4b illustrates the courses of the associated signal curves.

FIG. 5 illustrates a container as in FIGS. 1 and 3, where tapping takes place through a hole in the bottom and where the coils are placed below the melt and where both walls and bottom are subjected to wear.

FIG. 6 illustrates a modified container where the bottom slopes down towards the tap hole.

FIG. 7 illustrates a container where tapping takes place by tipping the container.

FIG. 8 schematically illustrates an electric circuit for carrying out measurements in accordance with the invention.

DESCRIPTION OF PREFERRED EMBODIMENTS

Figure 1A:
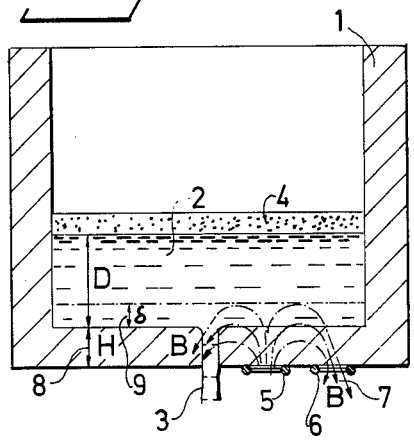
FIGS. 1a and b are schematic sectional views illustrating a container where tapping of molten metal is done through a hole in the bottom and where coils are placed below the melt.
Figure 1B:
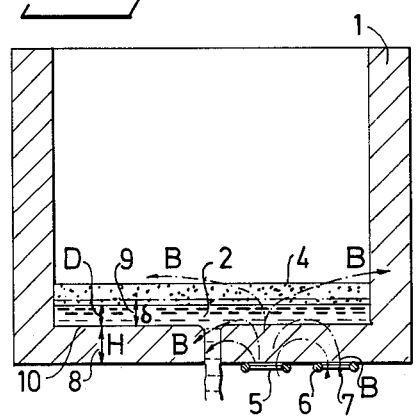
FIG. 1c illustrates the course of an associated signal curve.

FIGS. 1a and b illustrate a container 1 where tapping molten metal 2 takes place through a hole in the bottom 3 of the container and where tapping is to be broken off before slag 4 flows out. FIG. 1 also illustrates the method principal. In FIG. 1, a transmitter coil 5, supplied with alternating current of suitable frequency, is provided at the bottom part of the container at a given distance from the melt, e.g. outside the container lining, or between the lining and the possible plated casing of the container. A receiver coil 6, similarly placed at a given distance from the melt, measures a magnetic field B, 7 which is generated by the transmitter coil. The transmitter and receiver coils may suitably be of any known implementation and have a positioning such as is described in our previously-mentioned patents, the disclosures of which are hereby incorporated by reference. The coils are accordingly typically simple few-turn coils with a flat configuration and are substantilly freely placeable. A typical size is the same order of magnitude as 1/10 of the size of the container or greater than the thickness H, 8 of the bottom.

The container 1 is illustrated in FIG. 1a at one stage of the tapping procedure, when a comparatively large amount of melt still remains in the container, or a stage before the previously defined final phase of the tapping procedure. The magnetic field is reflected in the melt which has a thickness D above the bottom greater than the penetration depth δ, 9 of the magnetic field.

The lines of the magnetic field B, which would be spread out in the container 1 if it were empty, are thus deflected by the reflecting effect of the molten metal 2, and more magnetic field lines will pass through the plane of receiver coil 6 than if the container were empty. The signal which is measured across the receiver coil will thus be proportional to the number of magnetic field lines passing through the plane of the receiver coil, or more properly speaking the size of the magnetic field over the receiver coil.

Figure 1C:
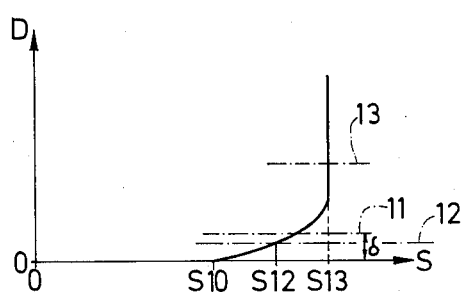

The signal across the receiver coil is illustrated in FIG. 1c where the signal level S is marked on the horizontal axis and the thickness D of the melt layer on the vertical axis. When the furnace has a relatively large amount of melt, i.e. in accordance with FIG. 1a, the signal will have a relatively high signal level S13, due to the reflection effect, while an empty container will give a lower signal level S10. Both signal levels are given and easy to determine.

In an intermediate stage between a container with a relativly large amount of melt and an empty container, the signal decreases continuously with the remaining melt thickness, due to the reflection effect diminishing continuously. This continuously decreasing signal occurs for a melt depth which is greater than the penetration depth δ of the magnetic field, as indicated at 11 in FIG. 1c.

An alarm or the like can be set for a given signal level S12. When the signal reaches this value the alarm is activated and tapping can be broken off. This corresponds to a certain unambigously determined remaining melt thickness. The signal change during the final phase of tapping unambiguously determines the layer thickness of the remaining melt in relation to the signal level for a large melt thickness 13 and for an empty container 10. This applies irrespective of coil size, distance etc. If a setting to zero is carried out, when the container contains a large amount of molten metal, signal level S13, and the signal level for an empty container S10 is known from previous measurement, the remaining melt layer thickness D will be substantially given by the mathematical relationship:

$$D = \delta \ln \frac{S13 - S10}{S - S10}$$

This signal function can be linearized in a manner known per se by treatment, e.g. in an analogue logarithmic amplifier or in a microcomputer. A measurement value can thus be obtained which is proportional to the layer thickness of molten metal.

From the above it will be seen that the measuring procedure proposed here gives the possibility of an exact measurement of the layer thickness during the final phase of the tapping procedure, and that this measurement is solely determined by the electromagnetic field penetration depth δ, particularly when consideration is given to the easily measurable signal values when the container is full and empty, respectively. The measurement will thus be entirely independent of all outside, difficultly controllable factors.

Figure 2A:
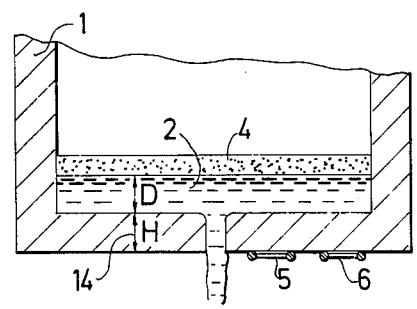
FIGS. 2a and b illustrate a container according to FIG. 1 where the bottom is subjected to wear.
Figure 2B:
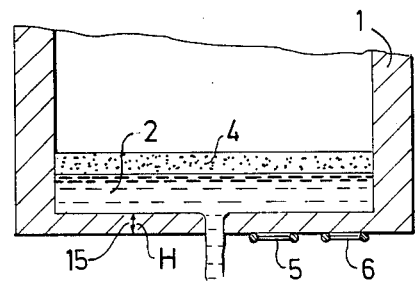
FIG. 2c illustrates the course of the associated signal curves.
Figure 2C:
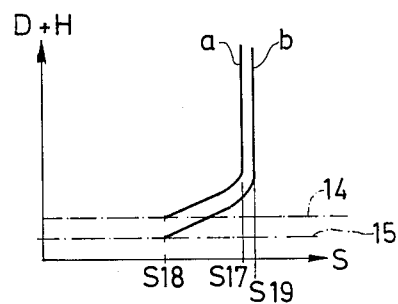

In FIGS. 2a-2c, the use of the invention is illustrated in a situation where the bottom in the container 1 is subject to wear, this being an example of the condition when an outside difficultly controllable factor is changed. In the container 1, its bottom may be worn during use, as illustrated in FIG. 2a, where the bottom 14 is unworn and in FIG. 2b where the bottom 15 is considerably worn. In the same way as in FIG. 1, a transmitter coil 5 and a receiver coil 6 are placed below the melt. FIG. 2c illustrates the signal course S during tapping the container, the vertical axis D+H representing the thickness of the remaining layer of molten metal D and the thickness H of the bottom 14 and 15, respectively. The signal curve a is for an unworn bottom and is in principal the same curve as in FIG. 1, with the signal value S17, when the container has a comparatively thick layer of molten metal left in the container (Dlarge), and with the signal value S18, when no melt remains in the container. If the bottom 15 is worn as in FIG. 2b (signal curve b), another signal value S19 is obtained when the layer thickness D is large, but the same signal value S18 when the container is empty. In the latter case, when the container is empty of metal melt, there is no difference in the signal level S18 in both cases, since all that is altered is the thickness of the bottom and possible slag. and neither of these materials affect the magnetic field. The signal curve between S19 and S18 for a worn bottom is changed with the thickness of the melt layer as previously discussed, i.e.

$$D = \delta \ln \frac{S19 - S18}{S19 - S}$$

Therefore, D will be the same when the expressions $$\frac{S19 - S18}{S19 - S} \text{ and } \frac{S17 - S18}{S17 - S}$$

have the same value.

An unambiguous signal course can be easily obtained if a constant signal value S18 is first taken away from the signal S, which is performed and set the first time the container is empty. The signal amplification is then adjusted so that the signal will always be the same when the container is full, i.e. when the layer thickness is large. Irrespective of the position of the bottom, signal changes are then obtained which substantially are only dependent on the thickness of the remaining melt and are independent of bottom wear. As a secondary function, it is also possible to obtain the thickness of the bottom (i.e. the wear) by studying the degree of amplification in the adjusted signal amplifier.

Principly the same signal processing based on the expressions above can be provided with a microcomputer. Even if the above signal processing is not carried out, but only the signal S with an alarm circuit based on it is used, the error in the measurement will be small even if S17 or S19 have different signal values. The absolute error will be minor, particularly if S is close to the value for S18, i.e. D is small. By suitable selection of the distance between the transmitter coil 5 and the receiver coil 6, signal deviations between unworn and worn bottom can be minimized, i.e. S17 and S19 can be made to be relatively alike. This is provided, e.g. if the distance between the parts of the transmitter coil and receiver coil closest together is of the same order of magnitude as the distance between the plane of the coils and the melt, in the case where the bottom is unworn.

FIG. 3 illustrates the use of the invention for a container 1, where the transmitter coil 5 is placed outside the wall of the container and above the plane defining the interesting measuring depth, i.e. the surface of the melt during the final phase of tapping.

The magnetic field B,7 created by the transmitter coil has a component 7a going directly from the transmitter coil to the receiver coil 6 and a component 7b which is reflected at the melt surface. The slag 4 does not effect either of the two components. If the container is emptied completely of metal, the previously reflected component 7b will be no more reflected and will go out through the bottom of the container, only the direct component 7a being measured by the receiver coil.

The signal alterations S which are measured in the receiver coil can be illustrated in diagram form as in FIG. 3b where the horizontal axis represents the signal S and the vertical axis represents the absolute height of the melt H+D in relation to the exterior of the container or to the coils. When the container is entirely empty, at 21, a lower signal value S21 is obtained than when a reflected component reaches the receiver coil. The top signal level S20 is obtained for the melt height 20. The measured signal falls during the final phase of tapping, i.e. for decreasing remaining layer thickness of molten metal (illustrated by the levels 22 and 23) from S20 to S21 in the same way and according to substantially the same relation as described in conjunction with FIG. 1.

When the height of the melt is such that melt partially covers both transmitter and receiver coils, height level 29 in FIG. 3, the molten metal screens the magnetic field so that only parts of it reach the receiver coil. The signal level S29 will be considerably smaller than when the surface of the melt is lower. When the container is practically full, e.g. level 28, the signal level S28 will be low, since practically no magnetic field now reaches the receiver coil.

The whole of the signal course illustrated in the diagram may be utilized for supervising or monitoring the tapping process, although the main interest is around the final tapping phase, i.e. typically between the levels 23 and 22. In such a case the signal can be followed, e.g. in the way described in conjunction with FIG. 1. In the simplest case, an alarm can be set at a suitable signal level, e.g. S24, when tapping should be broken off.

At the part of the signal curve course signifying that the coils are partially covered by melt, the absolute level of the melt in relation to the height of the coils can be determined by following the signal, and this information can be used to plan the termination of tapping. Furthermore, an electronic circuit or a microcomputer can be caused to scan the curve and find the maximum signal level S20 and its position 20, such that an alarm can be given, which can inform the operator attending the container that the tapping process is beginning to approach its end.

FIGS. 4a and 4b illustrate that placing coils according to FIG. 3 can be used, such that a reliable alarm is obtained independent of container wear and such that important information regarding other parameters in the system can be obtained at the same time.

FIG. 4a illustrates the same container 1 as in FIG. 3a, and the same placing of transmitter coil 5 and receiver coil 6. However, both the wall and bottom of the container are worn, and to different degrees. In the diagram in FIG. 4b, the signal courses S in relation to the outer bottom of the container and the coils are illustrated for tapping. The signal curve c in full lines represents the same situation as in FIG. 3, i.e. the container is not worn, and the dashed curve d represents the worn container. In both cases, the empty container gives the same signal level S21, but the absolute level H+D is then at different levels when the container is unworn, level 21a, and when it is worn, level 21b. The maximum signal magnitude will be less in the unworn case 20 than in the worn case 25, and since, according to previous discussion, the signal curve goes down from its maximum value to the value for an empty container when the layer thickness of the melt is of the order of magnitude $\delta$, the level range 20' and 25', respectively, over which the signal has greatest value will will be different in both cases. Furthermore, the signal curves c,d will be different in both cases, since the melt partially covers or screens the coils. The principal signal course is similar in both cases however.

Measurement of the layer thickness in the final phase of tapping can be done independent of the container wear, by normalizing the signal curves, as previously mentioned. If the maximum signal magnitudes S20 and S25, respectively, are registered manually or automatically, and the signal value S21 for an empty container has been measured, then $$\frac{S18 - S20}{S18 - S} \text{ and } \frac{S19 - S20}{S19 - S},$$

respectively, give a normalized signal having a signal intensity which is independent of container wear and only dependent on the layer thickness D of melt.

The maximum signals S20 and S25, respectively, substantially express the container diameter and can be used for determining it from previous empirical measurements or from theoretical calculations. If the container diameter is determined and the layer thickness D of melt is determined as before, the volume V of remaining melt in the final phase can be determined by multiplying the layer thickness D by the melt surface of the container calculated as $$\pi \cdot (\text{container diameter})^2 \cdot \tfrac{1}{4}.$$

The upper signal curve parts can also be normalized with the aid of S20 and S25, and thus the upper surface position of the melt can be determined during this period. The maximum lengths 20' and 25', respectively, are dependent on the position of the bottom and thereby this can also be determined.

The measurement of the true volume V of the melt during the final phase is of great practical importance, since this gives the possibility of calculating the outflow of melt from the container at every instant. The reduction in V, which is measured as a function of time, represents the melt which has run out from the container. This outflow should be substantially constant during the final phase of tapping, if the tap hole has a constant size and if only metal runs out. However, should slag begin to accompany the melt in the tapping stream, the slag takes up a portion of the tap hole diameter, the flow rate of molten metal decreasing. This can be measured by the volume decrease of melt being less rapid than what is normal, when only melt runs out.

FIG. 5 illustrates placing of transmitter coil 5 and receiver coil 6 in the container below the metal melt 2 as in FIG. 1, but where the coils have been given an extension such that the signal, when the container contains relatively much metal, is dependent on both bottom thickness 15 and wall thickness 16, i.e. also of the wear thereof. The same type of signal processing as mentioned in conjunction with FIGS. 1–4 can be used here, where melt volume and the wear may be measured in addition to the layer thickness of the metal melt.

FIG. 6 illustrates a container 1 where the inside 33 of the bottom slopes towards the tap hole 34 so that the metal melt can run out as completely as possible, without the risk of slag 4 being pulled down. The invention can also be used to advantage here for monitoring the final phase of the tapping process. A transmitter coil 5 and a receiver coil 6 are placed below the bottom so that a relatively large part of the bottom is affected by the magnetic field sent by the transmitter coil and measured by the receiver coil. Compared with a furnace containing comparatively much melt, the decrease of the signal during the final phase of tapping then will depend on the penetration depth of the magnetic field as well as the surface of the bottom surface covered by metal melt.

It will be easily understood that measurement during the final phase of the tapping procedure in this form of tapping vessel can also be performed with coils placed according to FIGS. 3 and 4, and that signals can be processed in the same way as described in conjunction with discussions bearing on FIGS. 1 to 5. An inclination towards the tap hole can also be provided if the container has a flat bottom but is inclined towards the tap hole, which is then not at the centre of the container but towards one side of it.

FIG. 7 illustrates how the apparatus can be arranged in a tippable furnace, ladle or container.

The furnace or container 1 is tapped here by tipping round a shaft 36, the melt 2 running out over a spout. In this case the slag 4 accompanies the melt continuously, although such that the proportion of slag in the tapped quantity increases and the proportion of melt decreases with the tapping time. In this case also it can be of interest to measure remaining molten metal for breaking off tapping at a suitable remaining layer thickness. A transmitter coil 5 and a receiver coil 6 are mounted in the vicinity of the tapping portion between the refractive lining 37 and the oven casing plate 38 in substantilly the same way in relation to the metal melt as is illustrated in FIG. 1. The same measurement and the same signal processing discussed in conjunction with FIG. 1 is therefore also applicable here.

In conjunction with certain metal production processes, e.g. when oxygen converters for the production of steel are used, the furnace or container is tipped as illustrated in FIG. 7, there being a tap hole 39 in the furnace wall, however, which is illustrated by dashed lines in FIG. 7. The thickness of the melt layer can be measured during the final phase here as well, as has been described earlier.

FIG. 8 illustrates the principal of an electronic circuit for utilization in conjunction with the invention. A frequency, selected giving consideration to the measuring problem on hand, is generated with the aid of an oscillator 51. The signal from the oscillator goes via a current regulator 52, an amplifier 53 and a current measurement transformer 54 to the transmitter coil 5. The transformer measures the current supplied to the transmitter coil and sends a signal to current control circuit 52 which keeps the current constant. The signal from the receiver coil 6 is amplified in an amplifier 57 and is rectified in a synchronous demodulator 59 with the aid of a reference signal 58 from the transmitter side. A zero setting circuit 60 gives a zero signal 61 when the system is in a basic condition, e.g. when there is no melt in the container (cf FIG. 1 and the description concerning it). A variable amplifier circuit 62 gives variable amplification to the signal depending on the setting of a variable receiver 63. The amplification is altered when the system is in a second basic condition, e.g. when the container has a considerable quantity of melt (cf FIG. 1 and the description concering it). The value of the setting of resistor 63 can be read off and constitutes a measure of the wear in the container. The signal from amplifier 62 is used to trigger an alarm 64 at a suitable signal level. It is also taken via a logarithmic amplifier 65 to an instrument 66 which will show the layer thickness of the molten metal. A microcomputer 67 can also be connected to the circuit for further signal processing and signal interpretation in accordance with what has been mentioned previously.

The circuit in FIG. 8 only shows one possible way of carrying out measurement and signal interpretation. It is obvious that other ways are possible when the principal for the method and signal interpretation is given.

It will be easily understood that the invention described in conjunction with the figures can be used for controlling a plurality of different types of tapping processes and in processes of widely differing sizes. Some practical values may be mentioned however. In a typical large system, e.g. a steel ladle with a diameter of 5 meters, the coils are typically of the order of magnitude 0.5 m and the penetration depth of the magnetic field of the order of magnitude 5 cm. In a small system e.g. for casting aluminium, the container diameter is typically of the order of magnitude 0.5 m and the coils of the order of magnitude 0.1 m with the penetration depth of the magnetic field of the order of magnitude 5 mm.

I claim:

1. A method for measuring the thickness of a layer of molten metal located between a bottom portion of a container and slag layer, the container arranged for tapping the molten metal from the container; comprising the steps of:

positioning a transmitter coil and a receiver coil at predetermined positions along the container; generating in the transmitter coil an alternating magnetic field having field components incident to a surface of the molten metal arranged substantially horizontal to a ground surface, said field interacting with the molten metal to induce changes in the field, said alternating magnetic field having a predetermined frequency to provide a penetration depth into the molten metal, said penetration depth being greater than a desired thickness of a residue layer of the molten metal in the container;

detecting with said receiver coil said field changes caused by the slag layer approaching the bottom portion of the container and providing a measurement signal representing the thickness of the layer of molten metal remaining in the container, said measurement signal being proportional to the thickness of the molten metal layer, such that the magnitude of the measurement signal, while passing the penetration depth, diminishes as the thickness of the molten metal layer approaches the desired thickness, as a result of the field components increasingly passing through the remaining layer of the molten metal instead of being reflected toward the receiver coil, wherein the alternating magnetic field is generated from a position below the molten metal layer, such that components of the field incident against a lower portion of the substantially horizontal surface of the molten metal layer, said field changes being detected by detecting alternating magnetic components reflected back from the lower surface of the molten metal layer.

2. A method of measuring the thickness of a layer of molten metal located between a bottom portion of a container and slag layer the container arranged for tapping the molten metal from the container; comprising the steps of:

positioning a transmitter coil and a receiver coil at predetermined positions along the container; generating in the transmitter coil an alternating magnetic field having field components incident to a surface of the molten metal arranged substantially horizontal to a ground surface, said field interacting with the molten metal to induce changes in the field, said alternating magnetic field having a predetermined frequency to provide a penetration depth into the molten metal, said penetration depth being greater than a desired thickness of a residue layer of the molten metal in the container;

detecting with said receiver coil said field changes caused by the slag layer approaching the bottom portion of the container and providing a measurement signal representing the thickness of the layer of molten metal remaining in the container, said measurement signal being proportional to the thickness of the molten metal layer, such that the magnitude of the measurement signal, while passing the penetration depth, diminishes as the thickness of the molten metal layer approaches the desired thickness, as a result of the field components increasingly passing through the remaining layer of the molten metal instead of being reflected toward the receiver coil, wherein the alternating magnetic field is generated from one side of the molten metal, so that components of the field incident against the surface of the molten metal and are reflected toward the receiving coil positioned along another side of the molten metal.

3. An apparatus for measuring the thickness of a layer of molten metal located between a bottom portion of a container and a slag layer, the container arranged for tapping the molten metal from the container, comprising a transmitter coil arranged for being supplied by generator means for generating an alternating magnetic field having field components incident to the surface of the molten metal arranged substantially horizontal to the ground surface, a receiver coil arranged so as to detect alternating magnetic field changes caused by the slag layer moving toward the bottom portion of the container and to generate a measurement value signal corresponding thereto, and means connected to the receiver coil for evaluating the measurement value signal, wherein said generator means are arranged for energizing the transmitter coil with a predetermined frequency to provide a penetration depth into the molten metal, said penetration depth being greater than a desired thickness of a residue layer of the molten metal in the container; said transmitter and receiver coils being positioned such that when the thickness of the remaining layer of molten metal, while passing the penetration depth, approaches the desired thickness, the receiver coil detects less alternating magnetic field components reflected at the molten metal surface, as a result of the field components increasing passing through the remaining layer of molten metal, to provide an indication of the thickness of the layer of molten metal remaining in the container wherein the transmitter and receiver coils are positioned below the lower surface of the remaining layer of molten metal.

4. Apparatus as claimed in claim 3, wherein the transmitter and receiver coils have axes which are directed substantially transverse to the surface of the metal melt.

5. Apparatus as claimed in claim 3, wherein the coils have a substantially flat configuration and have at least a single turn.

6. Apparatus as claimed in claim 4, wherein, the coils have a substantially flat configuration and have at least a single turn.

* * * * *